April 25, 1950 G. SIM 2,505,153
TELEGRAPHIC SELECTING APPARATUS
Filed May 31, 1947 5 Sheets-Sheet 1

INVENTOR
GORDON SIM
BY Emery Robinson
ATTORNEY

INVENTOR
GORDON SIM
ATTORNEY

INVENTOR
GORDON SIM
BY Emery Robinson
ATTORNEY

April 25, 1950 G. SIM 2,505,153
TELEGRAPHIC SELECTING APPARATUS
Filed May 31, 1947 5 Sheets-Sheet 4
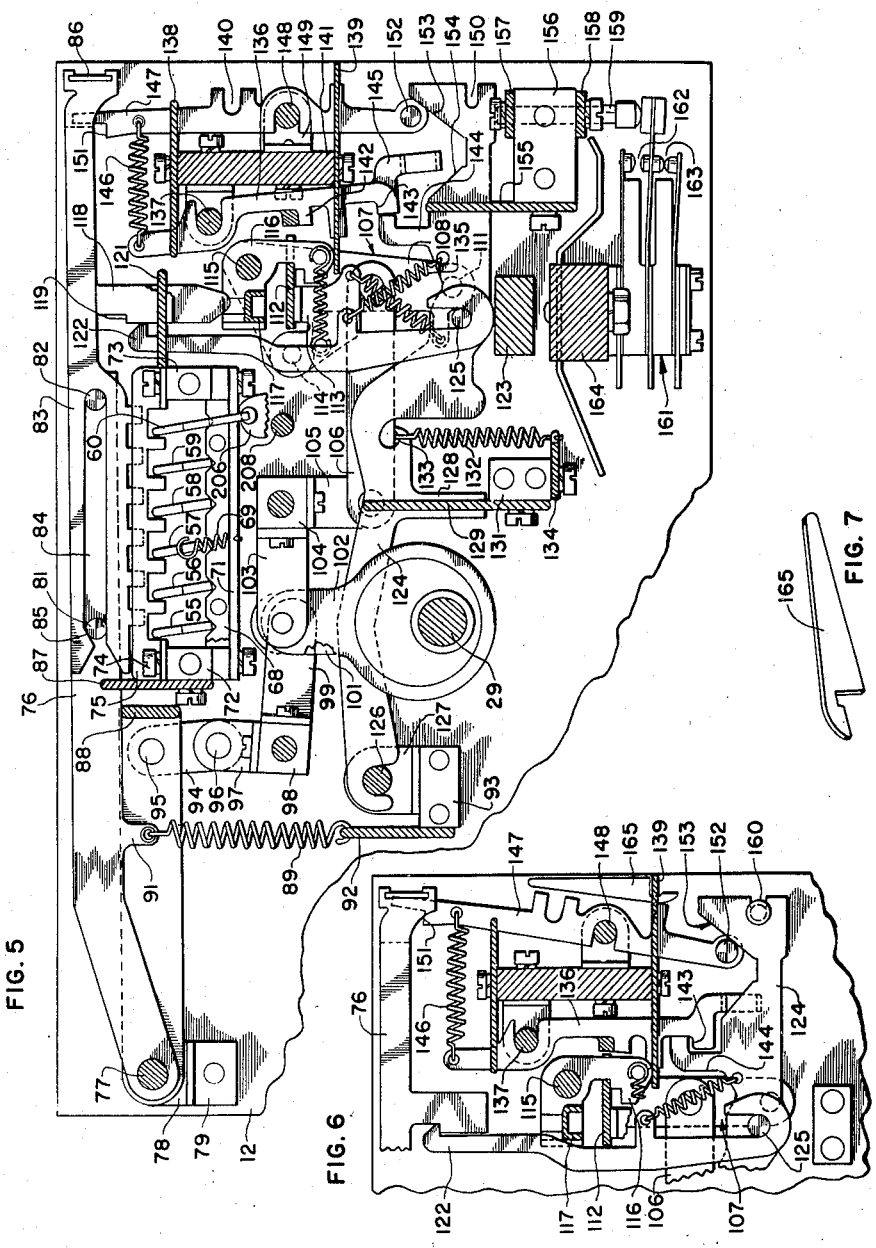
INVENTOR
GORDON SIM
BY Emery Robinson
ATTORNEY April 25, 1950 G. SIM 2,505,153
TELEGRAPHIC SELECTING APPARATUS
Filed May 31, 1947 5 Sheets-Sheet 5
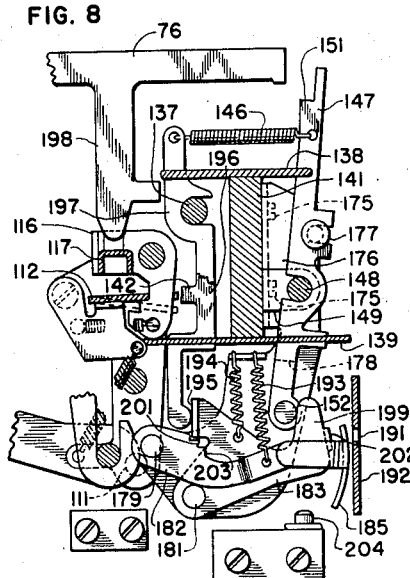
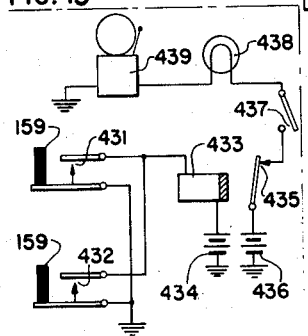
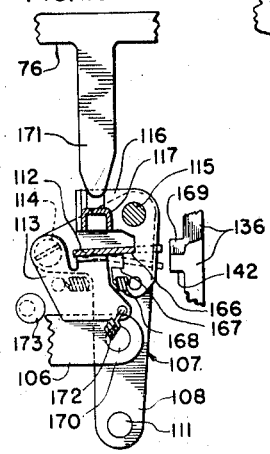
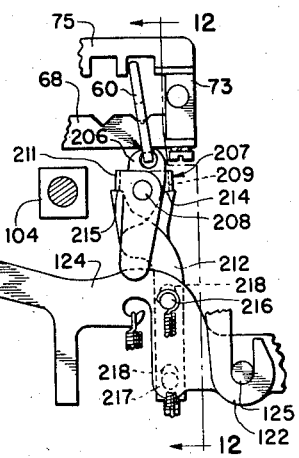
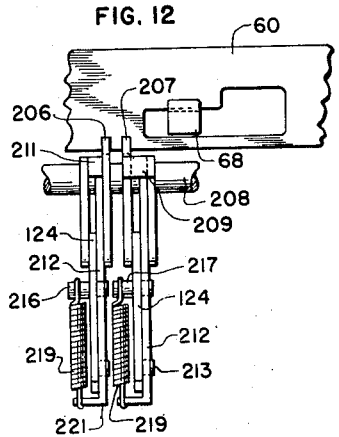
INVENTOR
GORDON SIM
BY Emery Robinson
ATTORNEY Patented Apr. 25, 1950

2,505,153

UNITED STATES PATENT OFFICE 2,505,153

TELEGRAPHIC SELECTING APPARATUS

Gordon Sim, Chicago, Ill., assignor to Teletype Corporation, Chicago, Ill., a corporation of Delaware Application May 31, 1947, Serial No. 751,505

7 Claims. (Cl. 178—33)

The present invention pertains to printing telegraph apparatus and more particularly to improvements in permutation code controlled selecting devices.

The primary object of the invention is to provide means for facilitating the selective operations of a permutation code selecting device.

Another object of the invention is to provide a code controlled selecting device having coded elements which are readily demountable on and interchangeable with respect to the selectable members.

A further object of the invention is to provide a selectively directable bail instrumentality operable upon selective groups of elements.

Still another object is to provide novel means for checking operating range and orientation of the code selecting device of the present invention.

Many features included in the disclosure of the present application are also disclosed in one of the following copending applications; namely Serial No. 739,747 filed April 7, 1947 by W. J. Zenner, or Serial No. 786,171 filed November 15, 1947 by G. G. Keyes. The structure according to the present invention is particularly adapted for use with automatic transmission control in connection with preliminary collection of weather or other information over a telegraph communication system, such as disclosed in the copending application of G. G. Keyes. Control of the system shown in said copending application is provided by the control equipment of the present invention located at the primary switching center or master control station on the loop circuit. Said system also utilizes the selector mechanism disclosed herein at each way station, which mechanism is always connected to the line and surveys the information passing over the line.

A particular adaptation of the embodiment of the invention shown is in air traffic control systems wherein it is contemplated that weather information shall be collected hourly, at which times transmission of such information, which has been previously prepared on perforated tape, from each station will occur automatically under the control of the master control station in predetermined order in response to the operation of a switch at the master control station. The apparatus at each secondary or way station is arranged to read the signals transmitted over the line from the primary station, and since each way station apparatus is responsive to its own station identification group of codes, the selected way station will respond to these codes and start transmission of the data contained in the perforated tape at the way station (for example, the weather information). At the end of the data (or weather information) transmission, codes are transmitted by the way station which are recognized by the primary or master control unit, which is also of the type according to the present invention, for the purpose of starting the transmission of actuating codes for the next way station to be called in. This cycle will be repeated until the last selected way station has reported, whereupon an appropriate signal, which is contained in the loop of tape, is transmitted from the primary or central station, the effect of which is to shut down the apparatus at the central station.

A better understanding of the invention may be had from the following description taken in conjunction with the accompanying drawings, wherein;

Figs. 3 and 3A are views showing the main shaft clutch mechanism;

Fig. 5 is a cross sectional view taken substantially on line 5—5 of Fig. 1;

Fig. 6 is a fragmental cross sectional view showing the corresponding portion of Fig. 5 in an operated position;

Fig. 7 is a perspective view of the gate;

Figs. 8, 9, and 10 are fragmental sectional views and front elevation, respectively, showing features of the pivoted bail and the signal testing device;

Figs. 11 and 12 are fragmental views illustrating the sixth vane control mechanism;

Fig. 13 is a detail view of the pivoted bail member;

Fig. 14 is a view of an alternate form of latch lever releasing means; and

Fig. 15 is a circuit diagram showing an alternate form of signal testing device.

Figure 1:
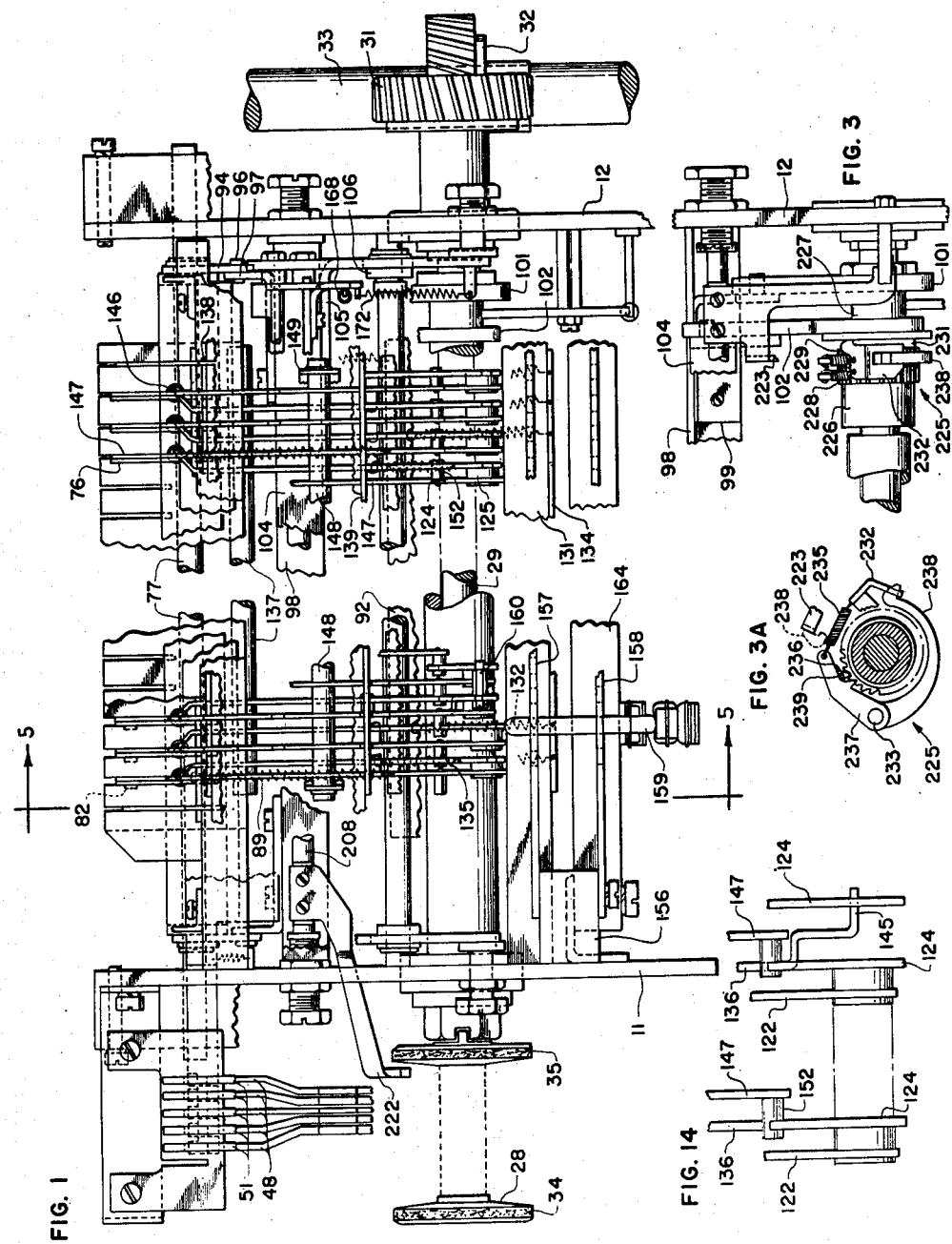
Fig. 1 is a front elevational view of the control unit.
Figure 2:
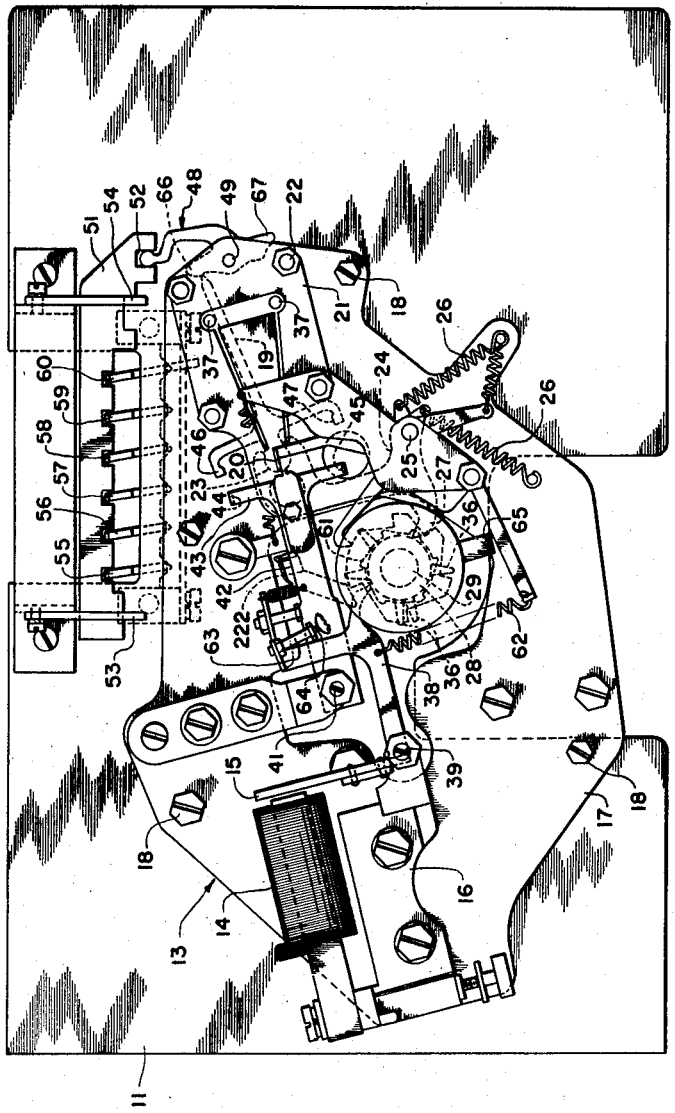
Fig. 2 is a side elevational view of the control unit showing the selector mechanism.
Figure 4:
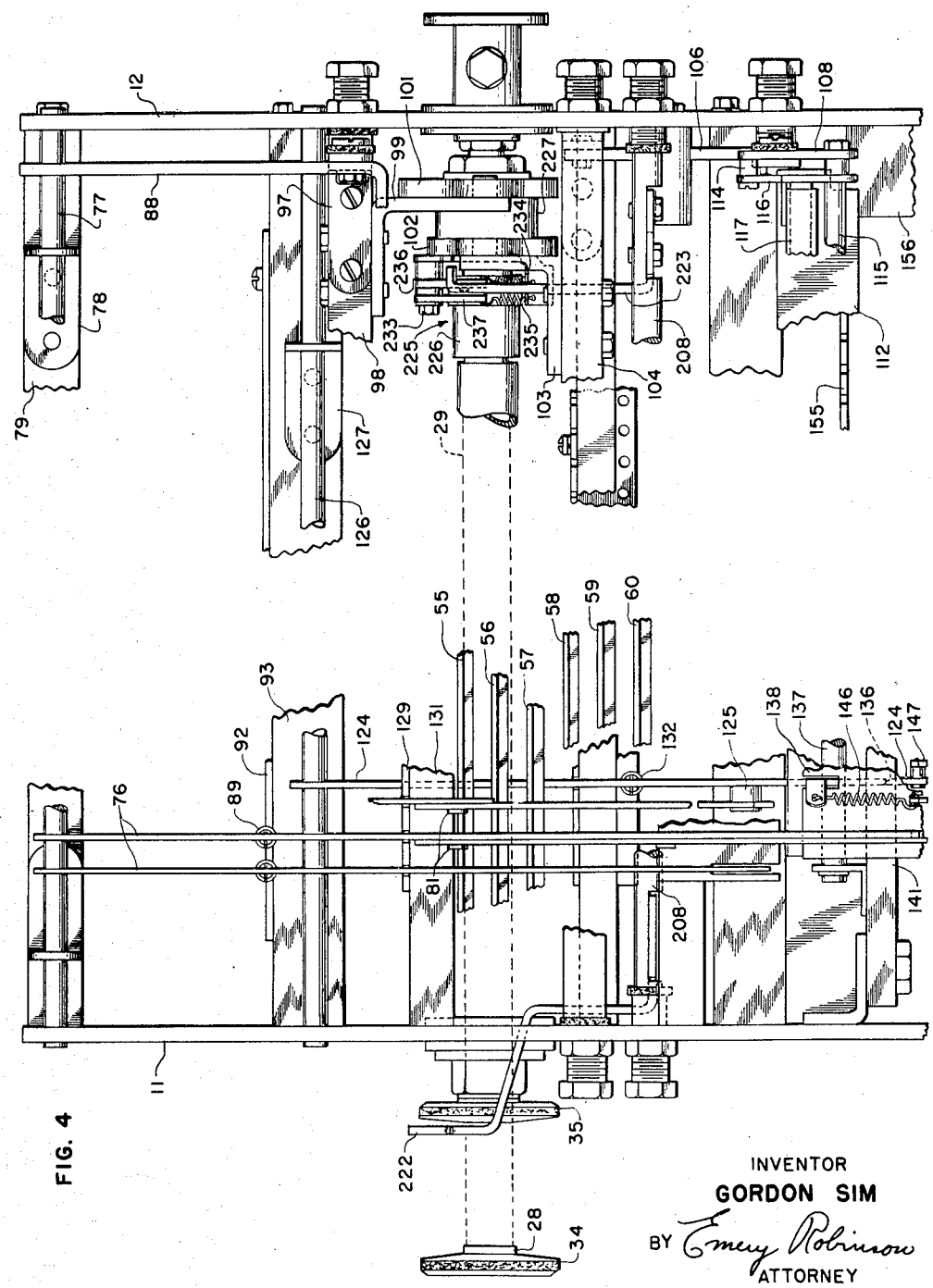
Fig. 4 is a top view of the control unit.

Having reference to the drawings, the control unit according to the invention comprises a structure which is composed of side plates 11 and 12, and a plurality of cross-bars hereinafter specifically referred to, which are secured to the side plates to form a rigid framework for the arrangement of the mechanism for achieving the various objects and functions of the invention. Referring to Fig. 2, there is mounted on the outside of side plate 11 of the aforesaid structure (also shown on the left side of the apparatus, as viewed in Fig. 1) is a selector mechanism, generally indicated as 13, which is responsive to received code combinations of signaling impulses. The selector mechanism 13 is of the type shown in United States Patent No. 1,745,633 granted February 4, 1930, to S. Morton et al., and comprises a selector magnet 14 which is connected in the line circuit and controls an armature 15. Magnet 14 is supported on a bracket 16 carried on a selector mounting plate 17. Plate 17 is held in spaced relation with side plates 11 by suitable spacing elements 18.

The selector mechanism 13 comprises a set of five selector elements in the form of thin flat fingers 19 arranged in substantial overlapping relation between suitable guide plates 21. These plates 21 are mounted on studs 22 and spaced by washers (not shown). The circular rear ends 20 of the fingers or swords 19 engage corresponding sockets 23 in a corresponding series of thin flat bell cranks 24 pivoted on a common shaft 25. Individual springs 26 normally hold the bell cranks and selector swords into the position shown in Fig. 2 with the pointed rear end of the bell cranks 24 in contact with a cam barrel 28 on shaft 29 which is driven continuously through interconnecting gears 31 and 32 and cross shaft 33 by a properly regulated motor (not shown), the driving connection between the shaft 29 and the cam barrel 28 being established through friction clutches 34 and 35 (Fig. 1).

The cam barrel 28 is provided with a helically arranged series of cams 36, one for each of the bell cranks 24, which rotates the bell cranks 24 (five in the present instance) in succession and thus reciprocates longitudinally the succession of selector swords 19 as the cam barrel 28 is rotated. In addition to the longitudinal movement, the selector swords 19 have a lateral pivoting movement between a pair of stops 37.

The setting of any selector sword 19 either to its right-hand or to its left-hand position is determined by the selector magnet 14. The magnet armature 15 is fixed to a flutter lever 38 which is pivoted on a stud shaft 39 carried in the mounting plate 17. Mounted on a pivot shaft 41 adjustably positioned and adjacent to, and in cooperative relation with the flutter lever 38 is a selector lever 42. Lever 42 terminates at its free end in a U-shaped portion 43 having downwardly extending arms 44 and 45 which constitute abutments which cooperate with arms 46 and 47 on the rear end of the selector swords 19 and act to position the latter in either a right-hand or left-hand position. The several swords 19 act through a corresponding number of rocker levers 48, arranged between the guide plates 21 and pivotally mounted on a stud shaft 49, to position a set of notched members 51. Levers 48 are pivotally articulated to the bar 51 through means comprising the ball shaped ends of the levers 48 cooperating with notches 52 in the permutation bars 51.

The permutation bars 51 are slidably carried in a pair of comb guide bars 53 and 54 extending from and attached to side plate 11. Each of the permutation bars 51 is provided with a notch which engages operatively the end of a vane member 55 to 60, inclusive.

The springs 26 associated with the bell cranks 24 normally hold the selector swords 19 in their forward position and in engagement with the rocker levers 48, and each permutation bar 51 thus is held in either one or the other of its two positions according to the position of the associated selector sword 19 against one or the other of its stops 37.

As the signal impulses are received, the selector magnet 14 which is connected either directly in the line or through a line relay, responds only to one of the two different electrical conditions comprising the signals and seizes its armature 15 when a marking impulse is received, and releases it again when a spacing signal is received, while the selector fingers or swords 19 are reciprocated successively in synchronism with the signal by the cams 36 of the spiral series of cams on the cam barrel 28. The arms 46 and 47 are thereby brought into cooperative relation with the abutments 44 and 45 at the corresponding signal intervals, thereupon setting the selector fingers or swords 19 in their variant combinations. In practical operation, however, in order to insure the alignment of abutments 44 and 45 and arms 46 and 47 in their respective cooperative positions, limiting stops may be provided for the member 42 analogous to stops 37 for the swords 19. The particular selector mechanism shown in Fig. 1 is of the assisted armature type shown in United States Patent No. 1,937,376, issued to W. J. Zenner, wherein the armature 15 is assisted to the poles of the magnet 14 by the action of a star wheel cam 61 upon the lever arm 38, and the selector lever 42 is resiliently connected to the lever arm 38.

As previously mentioned, the normal condition of the line is marking, and hence the line magnet 14 is normally energized. During the first line impulse or start interval which is of spacing nature, the electromagnet 14 is de-energized, and the movement of the armature lever 15 which will be actuated by its spring 62 will cause the set screw 63 to shift the plunger 64 to initiate operation or rotation of the selector cam barrel, as clearly described in the aforementioned patent to Zenner. The cycle of operation of the cam barrel 28 thus is initiated. Stop arm 65 is thus released and the cam barrel 28 is permitted to rotate one cycle, which cycle is terminated, in a well known manner, by the reception of a stop impulse.

Thus, as the cam barrel 28 is rotated, the cams 36 act to actuate the bell crank lever 24 counter-clockwise (as viewed in Fig. 2) to reciprocate the swords 19, thereby bringing the arm 46 or 47 into contact with abutments 44 or 45 depending upon whether the selector magnet 14 has responded to a marking or a spacing condition. Then, the levers 24 are actuated clockwise to bring the swords 19 into contact with one or the other arms 66 or 67 of the rocker lever 48. The rocker levers 48 then actuate the permutation bars 51 rightwardly or leftwardly (as viewed in Fig. 2) according to whether a marking signal or a spacing signal has been received. As previously mentioned, each of the bars 51 is notched to engage a single vane 55 to 59, inclusive, so that as the bars 51 are selected or actuated permutatively, the respective vanes 55 to 59 will be rocked correspondingly.

The vanes 55 to 59 rest in V-shaped grooves or notches formed in a pair of supporting bars 68 (Fig. 5) one in proximity to each of the side plates 11 and 12 and are adapted to rock about the V-shaped grooves as fulcrums. As shown in Fig. 5, the vanes are biased to their clockwise or counterclockwise position by an overcentering spring 69 (only one such spring being shown in Fig. 5 for the sake of clarity) extending from the upper half of the vane (the lower half being cut away) to a spring bar 71 connected to crossbars 72 and 73 extending between and connected to the side plates 11 and 12. Mounted on the crossbars 72 and 73 by means of screws 74 is a plate 75, the bottom edge of which is notched to provide limiting stops for the vanes 55 to 59 so that their extreme clockwise and counterclockwise movements may be definitely determined.

Arranged transversely above the vanes 55 to 59 are a plurality of selectable bars 76 which are pivoted at the rear of the structure (to the left as viewed in Fig. 5) on a pivot shaft 77 carried on brackets 78 mounted on a crossbar 79 extending between and connected to the side plates 11 and 12. The selectable bars 76 are provided with a pair of studs 81 and 82 which are adapted to be engageable by a code element 83, one such element being associated with a selectable bar 76. The code elements 83 are provided with deep open ended slots 84, and the free ends of the tines being beveled to permit ready application of the code element 83 over the studs 81 and 82. The upper tine is provided with a cam bevel 85 which serves to impart pressure upon the stud 81 to maintain the code element 83 securely in place. The code elements 83 are provided on their bottom edges adjacent the vanes 55 to 59 with wards and notches permutatively arranged according to the symbols or characters the particular selectable bar represents. The code elements 83 are each provided at the right-hand extremity, as shown in Fig. 5, with a means for receiving the insignia plate 86.

The series of selectable bars 76 are guided vertically in a comb bar 87 and are adapted to rest upon a bail 88 which is pivotally mounted on the shaft 77. Individual springs 89 act to bias each of the selectable bars against the bail 88, the springs extending from projections 91 on the selectable bars 76 to a spring bar 92 fixed to a crossbar 93 extending between and connected to the side plates 11 and 12. When the selectable bars 76 rest normally upon the bail 88, the wards and notches of the code elements 83 are held away from the vanes 55 to 59.

The operating means for bail 88 comprises a link 94 pivotally connected at 95 to the bail 88, the other end of the link 94 being connected at 96 to a bracket 97 carried on a rock shaft 98 journaled in the side plates 11 and 12. Also secured to the rock shaft 98 is a bracket 99 the outward end of which is pivotally connected to an eccentric 101 mounted operatively on the main shaft 29. Thus, as the shaft 29 rotates, the eccentric 101 will, through bracket 99, cause the rock shaft 98 to rock and thus through a toggle action between the bracket 97 and link 94 the bail 88 will be oscillated.

Also carried on the main operating shaft 29 is an eccentric 102 which is connected to a bracket 103 carried on a second rock shaft 104 journaled in the side plates 11 and 12. Rock shaft 104 is provided with a depending bracket 105 which is pivotally connected to a link 106, the other end of the link 106 being pivotally connected to a bail, generally indicated as 107.

Bail 107 comprises a pair of side members 108 which are pivotally supported on individual studs 111 secured to the side plates 11 and 12. Thus, when the main shaft 29 is rotated, the eccentric 102 is reciprocated vertically to impart, through arm 103, a rocking motion to rocker shaft 104, which through link 106 oscillates bail 107 backwardly and forwardly (the right-hand side of the structure shown in Fig. 2 being considered the front thereof). Bail 107 also includes a bail blade 112 which is mounted on a pair of supports 113 pivotally carried on each of the side members 108 by means of pivots 114. Carried on pivots 115 on each of the side members 108 are a pair of latches 116 which are united by an inverted U-shaped bar 117 spaced above and substantially parallel to the bail blade 112. Then, when the bail 107 is operated, elements 112, 113, and 116 also move with it. The action of the latch 116 and pivoted support of blade 112 will appear hereinafter.

Each of the selectable bars 76 is provided with a depending portion 118 having a shoulder 119. Portions 118 are guided in a comb bar 121 and certain of the bars 76 are provided with a longer depending portion 118 for cooperating with the bar 117 in a manner to be described presently. Cooperating with the shoulder 119 of bars 76 are a corresponding series of pull bars 122 adapted to rest on a crossbar 123 extending between and united to side plates 11 and 12. Pull bars 122 are pivotally articulated to a corresponding series of levers 124 through individual pivot studs 125 carried on said levers 124. Levers 124 are pivotally mounted on a pivot shaft 126 carried in a pair of brackets 127 mounted on the crossbar 93. Levers 124 are provided with depending arms 128 through which said levers 124 are guided in a comb bar 129 secured to a crossbar 131 extending between and connected to the side plates 11 and 12. Each of the bars 124 is normally biased downwardly by an individual spring 132 distended between a hook 133 on the bar 124 and a spring bar 134 carried on the bottom of the crossbar 131. Thus, by means of springs 132 the bars 124 are normally adapted to rest upon the crossbar 123. A spring 135 extends between bar 124 and the pull bar 122 and normally acts to bias the pull bar 122 in a clockwise direction about the stud 125. The pull bars 122 are normally guided in the guide comb 121.

As will presently appear, the code bars 76 upon selection will through their shoulders 119 engage the pull bars 122, whereupon the bail 88 will lift the code bar and the engaged pull bar to thereby pivot the bar 124 associated with the operated pull bar 122 about its pivot 126 against the action of its individual spring 132. Associated with each bar 124 is a latch member 136 which is one of a series of latch levers pivotally carried on a pivot rod 137 journaled in the side plates 11 and 12. The latch levers 136 are guided in an upper comb 138 and a lower comb bar 139 secured to a cross bar 141 which extends between and is connected to the side plates 11 and 12. The latch levers 136 are provided with projections 142 individual thereto, which are of variable widths to cooperate with the bail blade 112 when it is desired to release shoulder 143 of the latch lever 136 from the hook portion 144 integral with the bar 124. Certain of the latch levers 136 are provided with a lower extending end 145, the purpose of which will hereinafter appear.

A spring 146 connects the upper end of a latch lever with an associated blocking lever 147. The series of blocking levers 147 corresponds to the series of latch levers 136 and is carried pivotally upon a pivot rod 148 journaled in the bracket 149 mounted on the crossbar 141. The blocking levers 147 are also guided in the combs 138 and 139.

Each blocking lever 147 is provided adjacent its upper end with a shoulder 151 which in the vertical position of bar 147, as shown in Fig. 5, acts to block or prevent the selection of an associated code bar 76. To enable the selection of a code bar 76 the blocking lever 147 associated therewith is swung clockwise about its pivot 148 by the coaction of stud 152, carried at the lower extremity of lever 147, and cam surface 153 on lever 124. The extension 145 when present on a latch lever 136, cooperates with a cam surface 154 on the lever 124. Levers 124 are guided near their forward end by a guide comb bar 155 secured to a block 156 secured to side plates 11 and 12.

Secured to the upper and lower surfaces of blocks 156 are a pair of bars 157 and 158 which serve as guides for plungers or interponents 159 positioned beneath the outer or forward extremities of levers 124. Each plunger 159 serves to operate a contact assembly 161 associated therewith. Contact assemblies 161 each comprise a pair of contacts 162 and 163, and are secured to a crossbar 164 extending between and connected to the side plates 11 and 12.

In Fig. 6 is shown the respective levers and bars in one of their operated positions. The lever 76 is shown in its upward position after having been selected and reciprocated vertically to engage the pull bar 122. The pull bar 122 through the stud 125 has raised the lever 124 upwardly so that the cam surface 153 of the lever 124 has cooperated with the stud 152 of the blocking lever 147 to swing or rotate the blocking lever 147 clockwise upon its pivot shaft 148, thus tensioning the spring 146. The lever 124 has been raised so that its hook portion 144 is in latching engagement with the shoulder 143 of the latch lever 136. The levers 136 and 124 remain in latching engagement through the action of spring 146.

Since all of the blocking levers normally assume their vertical position, as shown in Fig. 5, the shoulders 151 of the blocking levers 147 are all in a position to block the rotative or selective movement of their respective bars 76, thus precluding the possibility of effecting a selection. Thus, it becomes necessary in order to initiate the sequential selection of the bars 147 in accordance with the code designation of the particular station at which the unit is located to manually actuate one of the blocking levers 147 to its clockwise position enabling the selection of the first of the series of bars 76 and to remove the shoulder 151 from the path of the bar 76. Therefore, an instrumentality herein identified as a gate 165, shown in Fig. 6 and also shown in detail in Fig. 7, is provided, to be inserted in a slot in the guide bar 139 in front of its respective blocking lever so that the blocking lever 147 is actuated to its clockwise position to move the shoulder 151 out of cooperative relation with the front of the bar 76.

In Fig. 13 is shown a detailed view of bail member 107, previously mentioned as comprising side members 108, bail blade 112, supports 113, latches 116 and bar 117. As previously described, bail 107 is pivotally carried on studs 111, and is oscillated by the link 106 attached at 170 to the side member 108. As mentioned hereinbefore, the bail blade 112 is carried on a pair of supports 113 each of which is pivoted on studs 114 secured to the side frames 108. Bail blade 112 is suitably notched to cooperate with a pair of latches 116 each provided with a pair of stepped shoulders 166 and 167. A support 113 and a latch 116 comprise a pair of elements which are attrahently biased by a spring 168 extending therebetween.

Bail blade 112 is adapted to normally engage the shoulder or step 166 of latch 116 to hold said bail in operative relation with lugs 169 of certain latching levers 136. Upon the selective operation of certain selectable lever members 76, the depending arm of 171 thereof, which is longer than the arms 118 at the normal levers 76 will co-act with the inverted U-shaped bar 117 (which is attached to the latches 116) to actuate latches 116 counterclockwise against the pull of spring 168 to disengage shoulder 166 from bail blade 112, and permit the supports 113, carrying bail blade 112, to respond to the pull of a spring 172 (which is slightly stronger than spring 168) to bring the edge thereof into engagement with the shoulder 167. The bail blade 112 thus is brought into operative relation with the lug 142 of the bars 147 when the bail 107 is rotated or rocked in a rightward direction. When the bail 107 is rocked in a counterclockwise or leftward direction the supports 113 strike individual eccentric stud members 173 which are so adjusted that the movement of the bail 107 causes the supports 113 to be rocked counterclockwise to engage the blade 112 on shoulder 166. Thus, upon each oscillation of bail 107, the eccentric stud members 173 undertake to return the bail 112 to its position in engagement with shoulder 166, so that when the bail has been disengaged from the shoulder 166, through the selection of predetermined ones of levers 76, and engaged by shoulder 167, the ensuing counterclockwise movement of bail 107 will cause the supports 113 to strike the stud 173, thereby camming supports 113 counterclockwise on its pivot 114 to effect the re-engagement of blade 112 with shoulder 166.

In Figs. 8, 9, and 10 are shown details of the signal testing device, according to the present invention. Having reference to Fig. 8, there is secured to the crossbar 141 by means of screws 175 a bracket 176 for supporting the mechanism for the signal test feature of the invention. The common shaft 148 for the blocking levers 147 is mounted on the end brackets 149 secured to the crossbar 141, as previously described. The bracket 176 for supporting the signal testing mechanism is located just beyond and to the rear (as viewed in Fig. 8) of the bracket 149. The blocking lever 147, shown in Fig. 8, is particularly assigned to the RY combination (for example, the letter of characters R and Y). This blocking lever 147 is connected by a bridge 177 to an adjacent blocking lever 178 which has its lower portion removed or cut off.

Bracket 176 is provided with a pair of pivot studs 179 and 181 on which are pivotally supported lever arms 182 and 183, respectively. Lever arm 182 is provided at its free end with plate 184 having a target 185 and a finger piece 186. The target 185 is provided with three colored areas; namely, a red area 187, a green area 188, and a white area 189 viewable through an aperture 191 in the front plate 192. Lever arms 182 and 183 are normally biased counterclockwise about their pivots by individual springs 193 and 194, respectively, extending between said lever arms and a laterally directed flange on the bracket 176.

Lever arm 183 is provided with a laterally directed flange 195 which cooperates with a pair of levers 196 and 197 of similar design mounted on the latch lever shaft 137. Each of the levers 196 and 197 are provided with springs 146 extending between these levers 196 and 197 and blocking levers 147, the same as previously described in connection with the latch levers 136. The levers 76 assigned to the R and Y characters are each provided with a depending portion 198 comparable to portion 118 of the other levers except that these depending portions 198 are not provided with any latch shoulders. Lever arm 183 is provided with the finger piece 202, as previously mentioned, so that the lever 183 can be manually actuated or rotated around its pivot 181. Lever 183 is provided with a projection 199 which cooperates with a stud 152 on the associated blocking lever 147 so that when the lever 183 is actuated upwardly or counterclockwise the projection 199 cams the stud 152 leftwardly to rotate the blocking lever 147 clockwise about its pivot shaft 148 to bring the shoulder 151 of the blocking lever out of alignment or register with the forward end of the selectable lever 76.

As the lever 147 is thus rotated, the special lever 178 is also rotated therewith due to the interconnection therebetween by the bridge member 177. Then, upon the receipt of the R and Y signals, the levers 76 corresponding to the R and Y code combination will be selectably operated so that the depending projections 198 thereon will operate the latch 116 through the U-shaped bar 117. Thus, upon receipt of the R and Y signals, the bail 112 will be actuated from its solid line position to the dotted line position shown in Fig. 8 whereat it is no longer in alignment with the lug or projection 142 on the levers 196. Therefore, the bail 112 has no effect upon the RY test mechanism. However, if a mis-selection should occur or a character should be received other than the R or Y signals, the bail 112 will not be released and in its oscillating movement the bail blade 112 will co-act with the lug 142 to move or rotate the lever 196 counterclockwise about its pivot shaft 137 so that its lower end will strike the flange 195 of the lever 183 to cause the lever 183 to be rotated clockwise against the action of its spring 194 to bring the lateral flange 195 into engagement with the next shoulder or step 201 on the lever 182. Due to this action lever 182 is permitted to rock or move counterclockwise by its spring 193 to bring the red area 187 into register with the aperture 191 to impart an appropriate signal to the operator. Furthermore, the lever 183 in rotating clockwise will permit the lever 147 to be rotated counterclockwise by its spring 146 to bring the shoulder 151 into vertical alignment with the end of the selectable bar 76 thus preventing further selection of the bars 76 of the R and Y signals.

The RY test is therefore completed and may be reset for further RY tests by manipulating the handle extension 202 of the lever 183 to rotate the lever 183 counterclockwise thus bringing the lever 183 into the position shown in Fig. 8 whereat the flange 195 is again in engagement with the top shoulder or step. The RY test mechanism may be again brought into condition for the RY test by manipulating the handle 186 of the lever 182 so as to rotate the lever 182 downwardly or clockwise thus bringing the laterally disposed flange 195 of lever 183 into engagement with the top shoulder of the lever 182 as shown in Fig. 8. Should it be desired to disable the RY test mechanism temporarily, the handle 202 extending from the lever 183 is manipulated to rotate the lever 183 clockwise, as viewed in Fig. 8, to bring the flange 195 into engagement with the shoulder 203 of the lever 182 whereat the lever 183 is locked or detained against the action of its spring 194, and the blocking levers 147 and 178 retain their vertical position with the shoulders 151 in vertical alignment with the ends of the selectable bars 76. During the RY test, and upon receipt of a mis-selection, the lever 183 is actuated clockwise to strike and operate a plunger 204 which may either control a contact to illuminate a lamp or to ring a bell, in a well known manner.

An alternate form of signal (or R—Y) testing device is shown in Fig. 15, which is electrical rather than mechanical. A contact 431 (similar to contact 162) is associated with the R selector lever (of the series of levers 76) exemplified by plunger 159 associated therewith, and contact 432 is likewise associated with the Y selector lever. Contacts 431 and 432 are connected in parallel with a slow-to-release relay 433, so that the energizing circuit for relay 433 is completed from battery 434, through the winding of relay 433, and through either contact 431 or 432 to ground. Relay 433 controls a contact 435 which is included in a circuit extending from grounded battery 436, through contact 435, through manually operated switch 437, through lamp 438, and through alarm bell 439 to ground.

In the operation of the alternate form of signal testing device, the switch 437 (which is normally maintained open) is closed, and the R and Y test signals are received, the effect of which is to close contacts 431 and 432 alternately. The closing of either contact 431 or 432 will complete a circuit for energizing the relay 433. The armature of relay 433 will be attracted to open contact 435. Now, so long as contact 435 is maintained open, the alarms 438 and 439 are not operating, indicating that the sequence of R and Y characters are correctly received, the slow-to-release relay 433 remaining energized so long as impulses are received from contacts 431 and 432. However, if one or more characters R and Y are omitted (or other characters are interpolated) the slow-to-release relay 433 will de-energize causing contact 435 to close to give the alarm.

In Figs. 11 and 12 are illustrated the mechanism for controlling the sixth vane 60. The vane 60 is not controlled by a lever 48 (Fig. 2) but is independently controlled in response to code signal combinations instead of a signal impulse. However, in the event a six unit code is used, vane 60 will respond to a signal impulse in the same manner as vanes 55 to 59. Associated with the vane 60 are a pair of jaw-like structures or members 206 and 207 pivotally carried on a shaft 208 extending between the side frames 11 and 12. Members 206 and 207 are provided with diametrically opposite, laterally disposed portions 209 and 211 which cooperate with members 212 and 213 having abutments 214 and 215. Members 212 and 213 are each provided with studs or pins 216 and 217 which cooperate with slots 218 in the lever 124. The pins 216 and 217 are normally held at the bottom of the slots 218 by individual springs 219 extending between the pins 216 and a laterally directed portion 221 on the members 212 and 213.

Upon the receipt of a shift or unshift code signal the corresponding selectable bar 76 is actuated which through a pull bar 122 causes the associated lever 124 to be actuated upwardly (counterclockwise as viewed in Fig. 5). This action of lever 124 imparts through springs 219 vertical movement to its associated member 212 or 213 to bring the abutments 214 and 215 against the portions 209 and 211, respectively. In the event the abutment 215 strikes the portion 211 the member 206 is rotated clockwise to swing the vane 60 to the position shown in Fig. 11. On the other hand, in the event that the abutment 214 strikes the portion 209 of the member 207 the member 207 is rotated counterclockwise to impart reverse rotation to the vane 60 to swing it to the position opposite to that shown in Fig. 11.

In the general operation of the apparatus shown in Figs. 1 to 7, the code combinations of signaling impulses are received by the selector magnet 14 (Fig. 2) and are effective through the armature lever 15 and the flutter lever 38 in cooperation with the flutter cam on the cam assembly 28 to actuate the selector lever 42. Upon receipt of the start impulse which is of spacing nature the magnet 14 is de-energized and the selector lever 42 is actuated to operate the plunger 64, which has been explained in the afore-mentioned patent, to initiate rotation of the cam assembly 28. During the rotation of the cam assembly 28 the cam lugs thereon sequentially actuate the rocking levers 24 which in turn actuate the swords 19, which in cooperation with the abutments on the selector lever 42 operates the T-lever 48 to actuate the selector bars 51 rightwardly or leftwardly in accordance with the signaling impulse conditions. As is explained in the afore-mentioned patent, the cam projection on the cam sleeve 28 which is known as the clutch trip-off cam operates a clutch trip-off lever 222 (shown in Figs. 1 and 4). Lever 222 is conformed to extend through the side plate 11 and to be secured to a shaft 208 journaled in the side plates 11 and 12. At the opposite end of shaft 208 near side plate member 12 is secured a clutch release lever 223.

The main shaft clutch (Figs. 3, 3A, and 4), indicated generally as 225, is associated with a sleeve 226 fixed to the main shaft 29, and a sleeve 227 freely rotatable about the shaft 29. The sleeve 226 carries integral therewith a driving clutch member, and sleeve 227 carries a driven clutch member. The driving clutch member comprises a pair of oppositely related ratchet wheels 228 and 229 (Fig. 3), the teeth of one being staggered with respect to the other. The driven clutch member comprises a disc 231 integral with the sleeve 227 on which are carried a spring supporting extension 232 and a pawl carrying post 233. A pair of springs 234 and 235 are fixed to the extension 232 and normally tend to move pawls 236 and 237 individual to them in a direction so that the pawl teeth will engage with the teeth of the ratchet wheels 228 and 229. The teeth of the pawl are so related to the ratchet teeth that forward movement of the ratchet is imparted through pawl 236 to sleeve 227, and backlash is prevented by pawl 237. Pawl 236 is also provided with a stop arm 238 which is adapted to cooperate with the stop lever 223. Thus, when the pawl arm 238 strikes the stop arm 223, the pawl 238 rotates or rocks counterclockwise (as viewed in Fig. 3A) about pivot 233 thereby disengaging the tooth of pawl 236 from the ratchet 229. Moreover, the disengagement of pawl 236 in this manner will effect, through a stud 239 (Fig. 3A), the disengagement of pawl 237 from ratchet 228.

Thus, when the stop arm 223 is actuated to free the clutch 225 for a single cycle of rotation, the eccentrics 101 and 102 are operated. The eccentric 101 when operating, rocks the shaft 98, and through a toggle connection oscillates bail 88 which, upon its downward movement permits the selectable bars 78 to sense the permutative setting of the vanes 55 to 60. As previously mentioned, the selectable bars 76 are provided with readily removable and interchangeable code elements 83, which facilitates any desirable arrangement of characters. The selectable bar 76, which through its coded elements 83 is permitted to be selected by the vanes, drops farther than the remaining bars to bring its shoulder 119 into engagement with the pull bar 122 if the extremity of bar 76 is not blocked by shoulder 151. Upon the upward movement of bail 88 the selected bar 76 is returned and upon so doing, the pull bar 122 associated therewith is elevated to rock the bar 124 counterclockwise.

At this point it should be mentioned that all of the blocking levers 147 are normally in the vertical position shown in Fig. 5 with the shoulders 151 thereon blocking the selective movement of the bars 76.

The apparatus according to the present invention is adapted to respond to a predetermined sequence of code combinations to operate a contact to perform, or to initiate the performance of, a desired function. For each code combination of the predetermined sequence there is provided a code bar 76, a selection code element 83 cut for the specific code combination, a pull bar 122, an operating lever 124, a latching lever 136 and a blocking lever 147. The blocking lever 147 associated with the first code bar in the predetermined sequence is permanently held out of blocking position by a gate 165 (shown in Fig. 7) so as to permit the selection of the first character of the predetermined sequence. With this exception, each blocking lever 147 is normally positioned so as to block its associated code lever 76 and prevent it from operating. Accordingly, a succeeding blocking lever 147 is moved only when a previous code combination is a correct one in the predetermined sequence, thus conditioning its associated code lever 83 and permitting its operation by the next code combination in the sequence. The operating lever 124 when raised by th pull bar 122 associated therewith becomes latched in its upper position by means of shoulder 143 of said latching lever 136.

Each group of code signals pertaining to a particular way station comprises conditioning codes followed by the station identification letters of the way station from which transmission is desired followed by further conditioning codes. For example, in the system according to the present invention, such a group of code signals will comprise the following codes: "Carriage return," "Carriage return," "Letters" or unshift, A, B, C (or other station identification characters), "Space" and "Letters." Furthermore, the blocking levers 147 are arranged in accordance with this group of code signals and each code lever 83 is identified by its identification plate 86. The gate 165 is inserted, as shown in Fig. 6, to hold the first blocking lever 147, which initiates the predetermined sequence, in its unblocking position. Therefore, when the operating lever 124 associated with said first blocking lever 147 is actuated upwardly, it will move the pin 152 of the second or succeeding blocking lever and operate that blocking lever clockwise to the position shown in Fig. 6. Thus, the second blocking lever is controlled by the cam surface 153 of the first character operating lever 124 of the sequence or of the operating lever associated with the first code bar. After the first code bar is actuated by the first combination of the sequence it will move the blocking lever associated with the second bar out of its blocking position to permit the second code bar to operate should the proper code combination for the second bar be received.

If the second code combination received is the proper one, the second one of code bar 76 in the sequence will move down to latch with its corresponding pull bar 122, and the same operation takes place as was described for the first code combination. That is, the second bar 124 will condition the device for the selection of the third, etc. The subsequent selections of the predetermined sequence proceed in a similar manner. If the sequence of incoming code combinations correspond exactly to the predetermined sequence of code bars, then their associated levers will operate successively to ultimately close certain contacts 161 which control primary station equipment. The bail blade 112 at the proper time in the operating cycle unlatches the bar 124 and latching levers 136 of the preceding selection, thus making the selector code levers 76 responsive to the next code combination of the sequence.

Contacts 162 and 163 are operated by the movement of plungers 159 released by their associated operating levers 124. Normally the plungers 159 are held down by the operating levers 124. When an operating lever 124 is moved upwardly by a pull bar 122, the plunger 159 moves upward and permits the upper contact 162 to be closed. Contacts 162 are held closed so long as their associated lever 124 is latched up by a latching lever 136. In the present embodiment of the invention, two means for unlatching the latch levers 136 are provided. The first means comprises the stripper bail 112 which may be actuated to either of two positions to cooperate with projections 169 and/or 142 on the latch levers 136. Thus, only those latch levers 136 which are provided with projections or lugs 169 and 142 are unlatchable by stripper bail 112. The second means comprises an extension 145 (Fig. 14) on certain of the latching levers 136 instead of providing a projection 169 or 142 thereon, so that the unlatching function occurs in the next succeeding cycle instead of the same cycle, thereby permitting the contact 162 to remain closed for a greater length of time. The extension 145 is adapted to cooperate with the cam surface 154 of the adjacent operating lever 124, as shown in Figs. 5 and 14. According to the specific embodiment of the present invention, the pivoted bail 107 acts to open the locked contact 162 in the secondary or way station units, and extension 145 functions to open the latched contact at the primary or master control station. Also, at the primary station the blank code signal serves as a universal signal to open all previously closed contacts simultaneously.

As previously mentioned, in the selection of a secondary or way station, the proper condition, select and lock codes of the selected way station are transmitted from the master or primary station, and moreover, the way station equipment has facilities for recognizing these codes. However, in certain instances it is desirable to vary the condition codes without altering their effect upon the way station equipment. For example, under certain conditions of operation the condition codes transmitted are Carriage return, Carriage return, Letters; while under other conditions of operation the condition codes are Carriage return, Figures, Letters, both condition codes having the same effect upon the way station code recognition equipment. To achieve this result, certain adjacent blocking levers 147 are tied together by a bridge member 177, as exemplified by Figs. 8 and 9, which are removably insertable in notches 140 in said blocking levers 147. Thus, the series of levers 76 allotted to the condition codes have insignia plates 86 marked CR, CR, FIG, LET, with the adjacent CR and FIG blocking levers 147 tied together, so that the same result is achieved whether the condition codes are CR, CR, LET, or CR, FIG, LET. Of course, other combinations of codes may be utilized, and locked together differently. As indicated in Figs. 1, 5, and 6, the operating levers 124 are also each provided with a notch 150 for receiving a bridge member 160 for utilization in a manner similar to that just described.

A feature of the selector mechanism according to this invention is its readiness at all times to respond to a prescribed sequence even though preceded immediately by a random incomplete predescribed sequence, by virtue of the fact that the code bar for the first character of the sequence is unblocked by the gate 165 and is always sensing the vanes to start a new sequence. As will be apparent hereinafter, a predetermined group of code combinations, herein identified as the "unlock code group," will activate the primary or central controlling equipment in the ordinary manner to start transmission of the actuating codes for the next way station.

What is claimed is:

1. In a code controlled selecting device, signal responsive means, rockable selector vanes selectively positioned under control of said means, a plurality of selectable members positioned for movement toward and away from said vanes, each of said members provided with a pair of spaced mounting studs, and coded elements having permutably arranged wards and notches cooperable with said vanes, said coded elements provided with resilient bifurcations terminating in confronting cam portions whereby said coded elements are detachably mounted on said studs for cooperation with said vanes.

2. In a code controlled selecting device, signal responsive means, a series of rockable selector vanes selectively positioned under the control of said means, a plurality of members arranged for selectable operation under control of said vanes, means for normally blocking the selection of said members, means for conditioning said blocking means to facilitate selection of certain ones of said members in response to predetermined signals, means responsive to other than said predetermined signals to restore said blocking means to blocking condition, and condition indicating means controlled by said conditioning means and said restoring means.

3. In a code controlled selecting device, signal responsive means, a series of rockable selector vanes selectively positioned under the control of said means, a plurality of members arranged for selectable operation under control of said vanes, means for normally blocking the selection of said members, means for manually unblocking said blocking means to enable the selective response of said members, a plural position bail member effective under one condition of operation to control the continued response of said members and under another condition of operation to discontinue the selective response of said members, and means associated with certain of said members to determine the effectiveness of said bail member.

4. In a code controlled selecting device, signal responsive means, a series of elements selectively positioned under the control of said means, a plurality of members arranged for selectable operation under control of said elements, means for normally blocking the selection of said members, means for conditioning said blocking means to facilitate selection of certain ones of said members in response to predetermined signals, a plural position bail member effective under one condition of operation to control the continued response of said members to said predetermined signals and under another condition of operation to discontinue the selective response of said members, and means associated with said certain ones of said members to determine the effectiveness of said bail member.

5. In a code controlled selecting device, signal responsive means, a series of elements selectively positioned under the control of said means, a plurality of members arranged for selectable operation under control of said elements, means for normally blocking the selection of said members, means for conditioning said blocking means to facilitate selection of certain ones of said members in response to predetermined signals, a pivoted bail member effective under one condition of operation to control the continued response of said members to said predetermined signals and under another condition of operation to discontinue the selective response of said members, and condition indicating means controlled by said conditioning means and said pivoted bail member.

6. In combination, selecting means responsive to received permutation code combinations of signaling impulses, a group of elements controlled by said selecting means, members adapted to be selected by said elements, a series of operating levers having individual instrumentalities adapted to be operably engaged by said members, individual latches for said operating levers, bars for determining the selectability of said members, means for affording access to sequential response by said determining bars, whereby reception of code signal combinations in a predetermined order is recognized by said determining bars, and a plural position bail member effective under control of said elements to act upon said latches according to groups depending upon the determining bars actuated.

7. In a code controlled selecting device, signal responsive means, a series of elements selectively positioned under the control of said means, a plurality of members arranged for selectable operation under control of said elements, means for normally blocking the selection of said members, means for manually unblocking said blocking means to enable the selective response of said members, a plurality of interponents adapted to coact with said unblocking means, and a plural position bail member effective under one condition of operation to control the continued response of said members and under another condition of operation to discontinue through said interponents the selective response of said members.

GORDON SIM.

REFERENCES CITED

The following references are of record in the file of this patent:

UNITED STATES PATENTS

| Number | Name | Date |
| --- | --- | --- |
| 2,183,022 | Krum et al. | Dec. 12, 1939 |
| 2,262,471 | Shoenberg | Nov. 11, 1941 |
| 2,293,093 | Zenner | Aug. 18, 1942 |